Patented Oct. 31, 1950

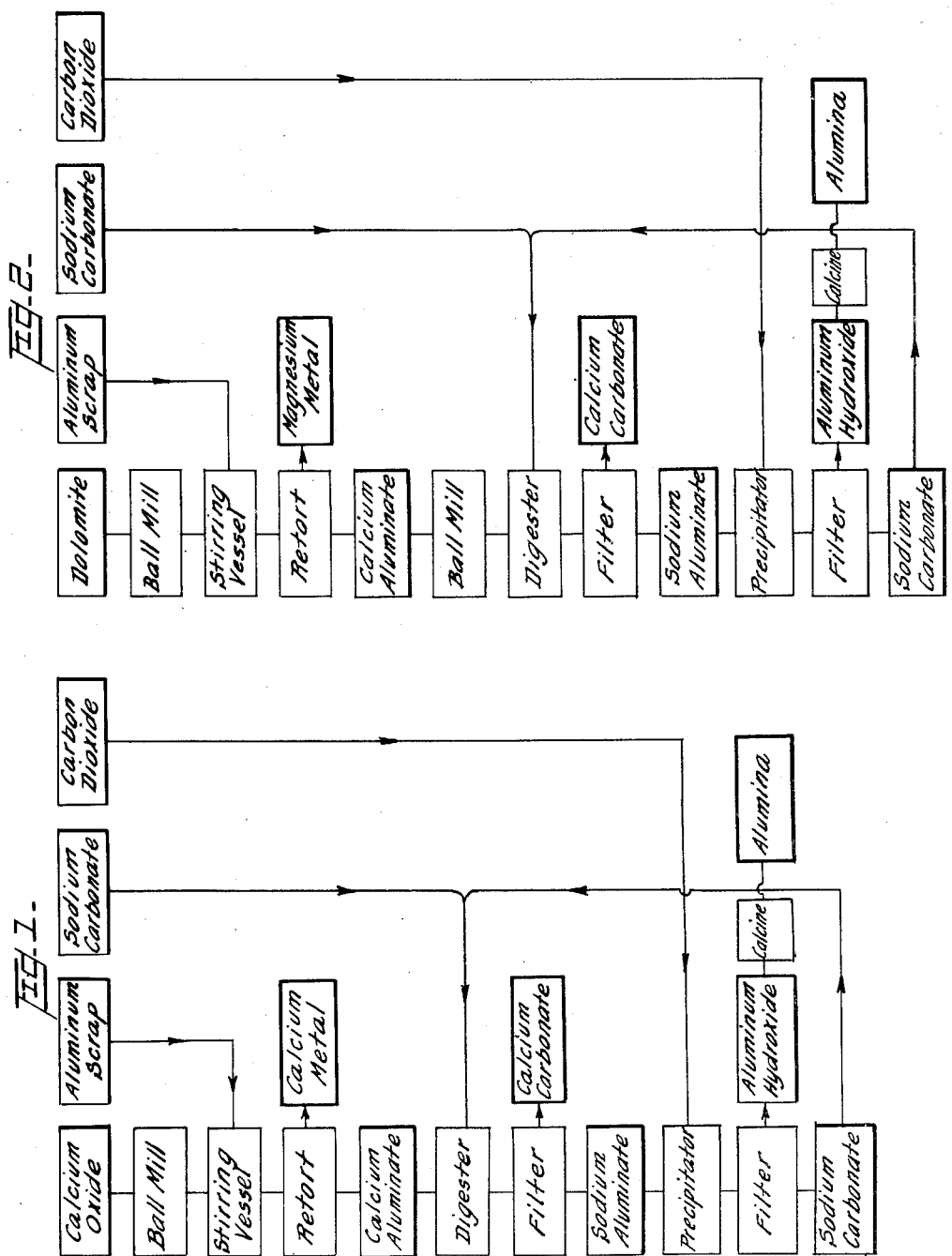

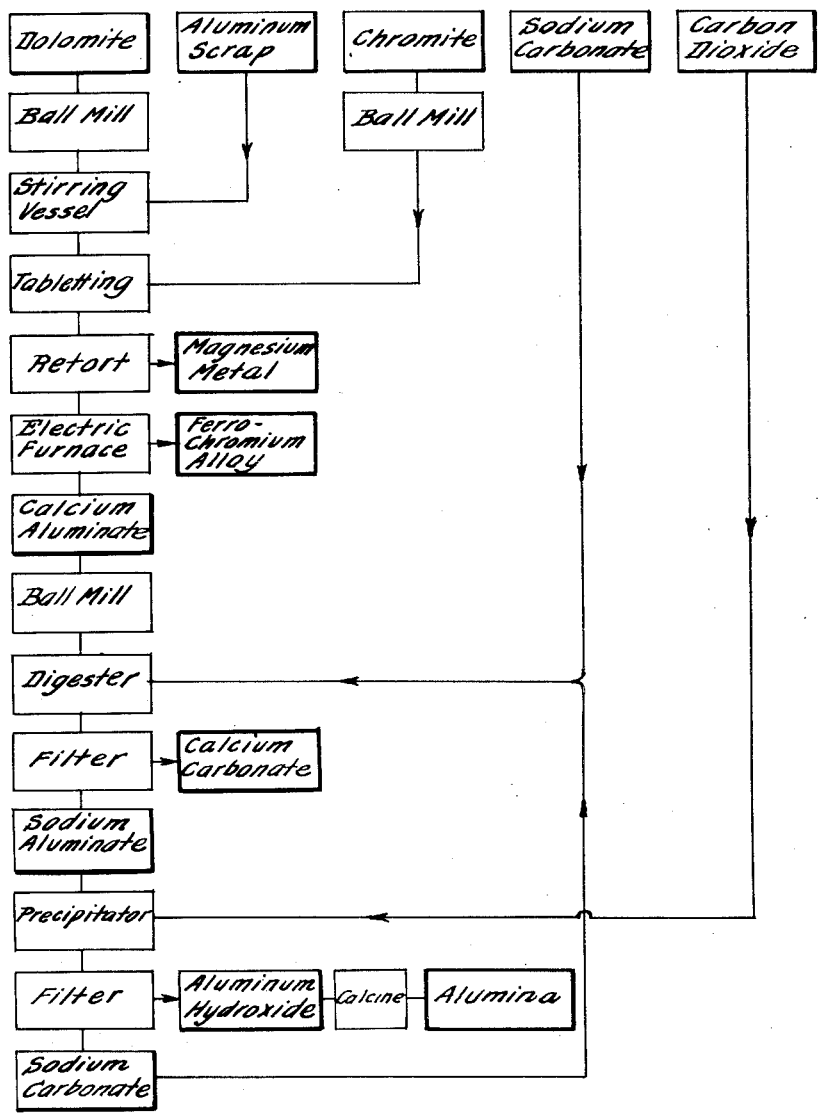

2,527,723

UNITED STATES PATENT OFFICE 2,527,723

RECOVERY OF VALUES FROM ALUMINUM SCRAP

Fritz J. Hansgirg, Black Mountain, N. C., assignor to North Carolina Magnesium Development Corporation, Asheville, N. C., a corporation of North Carolina Application May 28, 1946, Serial No. 672,812

8 Claims. (Cl. 75—67)

This invention relates to the recovering of pure alumina and other pure aluminum compounds from aluminum scrap, and has for its general object the provision of novel and improved processes for the utilization of the high free energy content of aluminum in effecting various kinds of metal reduction reactions, and at the same time obtaining the aluminum, from diversified and heterogeneous scrap, in the form of alumina or aluminum hydroxide free from alloying constituents.

More particularly, it is one of the objects of the invention to provide reduction processes wherein the aluminum scrap is reacted, in the presence of lime (calcium oxide), with an ore from which the metallic constituents are to be recovered, such metallic constituents recovered by appropriate heating processes (sublimation in the case of certain lighter metals and fusion in an electric furnace in the case of heavier metals), and the aluminum obtained in the form of calcium aluminate from which a powdered aluminum product may be recovered in the form of aluminum hydroxide or alumina, by means of appropriate reactions and precipitations.

Other objects and features of novelty will be apparent from the following specification when read in connection with the accompanying drawings in which certain of the processes are diagrammed by way of illustration.

In the drawings,

Figures 1, 2 and 3 are flow charts illustrating three exemplary processes illustrative of the invention.

The extensive use of aluminum alloys has produced a large market for aluminum scrap of wide variety, from whole airplanes down to small parts and household and kitchen utensils. Being obtained from such a wide variety of sources, this scrap is of a very diversified and heterogeneous composition. There are many methods used to remelt such scrap and to recast it into ingots to be used again in the same way as the virgin material. However, it is common knowledge in the industry that aluminum alloys for most uses must have an accurately controlled composition and consequently it is necessary to select the scrap very carefully if alloys of high quality are to be produced by these remelting and reclaiming processes. This careful selection can be made only by skilled personnel and this of course contributes greatly to the expense of making aluminum or aluminum alloy ingots from scrap. Furthermore, the scrap is available in a wide variety of forms, and includes thin sheets and small turnings, these elements causing large losses by burning during the remelting, and a considerable amount of flux has to be applied. All in all, it is a very expensive undertaking to recover aluminum metal or aluminum alloys of any controllable composition from aluminum scrap.

The present invention affords a way of utilizing such heterogeneous scrap, including sheet aluminum and turnings, but does not contemplate the use of powdered aluminum, as in the thermite processes disclaimed below, nor of the extremely thin aluminum wrapping foil which is associated with the use of aluminum powder in the Kemmer patent, 2,179,823. Such foil and pulverulent aluminum exhibit such surface phenomena and such special precautions are taken in handling and treating the same that these forms of aluminum raw material are definitely to be considered outside of the sphere of ordinary scrap and therefore without the purview of the present invention.

It has also been proposed to pursue processes which involve the dissolving of the scrap in a sodium hydroxide solution to convert the metal into alumina, and then reintroduce the alumina into the electrolytic processes to recover the virgin metal. Although such methods are successful in the recovery of the aluminum content of the scrap in a rather pure form, since most of the alloying constituents contained in the scrap are either not dissolved by the sodium hydroxide solution, or can be readily removed from the sodium aluminate solution, they are attended by high costs of production and great losses of the energy contained in the aluminum scrap. The high free energy content of aluminum scrap is expended in the production of hydrogen during the dissolving of the scrap in the sodium hydroxide, but it is generally difficult to make use of hydrogen so produced. The present invention proposes to make use of the free energy contained in the aluminum in other and more economical ways.

Other prior proposals, which have been carried out on a large technical scale, involve the use of aluminum as a reducing agent in metallurgical processes, but in all of these proposals no arrangements have ever been made to recover alumina after such reactions. These processes are generally designated thermite reduction processes and are especially applicable to the recovery of heavy metal alloys free from carbon, such as chromium, manganese, titanium, and vanadium alloys. In these processes, the heat of formation of aluminum oxide is so much greater than the heat of formation of the oxides of the heavy metals to be reduced, that such reactions proceed by themselves after they have been started by local heating of the mixture to the reaction temperature.

There are also other reduction reactions practiced involving the use of aluminum in connection with the elements of the first two groups of the periodic table, the alkali and the alkali earth metal oxides or oxidic compounds of these elements. In these cases, the differences between the heat of formation of aluminum oxide and the heat of formation of the metal oxide to be reacted is rather small, and is sometimes positive and sometimes negative. Therefore these reactions do not proceed of their own accord and heat has to be continuously supplied in order to maintain the temperature at which the reaction proceeds. In all of these cases, impure aluminum oxide is formed during the reaction, sometimes in the molten state in forming some kind of corundum, and it is difficult to recover pure alumina from such slags.

Now according to the provisions of the present invention, the reduction reactions effected by the use of aluminum scrap, are carried out in the presence of such quantity of lime (calcium oxide) as will produce calcium aluminate as an end product of the reaction. The calcium aluminate can be easily converted into aluminum hydroxide by reacting it with sodium hydroxide or sodium carbonate in well known ways. By this method, it is possible to make use of the free energy contained in the aluminum scrap for effecting reduction reactions, and at the same time to produce, in addition to the reduced metal, an alumina-containing product which is in such form that pure aluminum hydroxide can be recovered from it.

There exist several raw materials in nature which can be employed successfully in such reactions. For example, dolomite is a mineral which has a composition comprising an equi-molecular mixture of calcium carbonate and magnesium carbonate, usually containing only a few percent of impurities comprising silica and iron oxide. The dolomite is first calcined to remove the carbon dioxide, and the resulting mixture of calcium and magnesium oxides is mixed in finely powdered form with aluminum scrap in such proportions that the aluminum will react with the magnesium oxide to form metallic magnesium and calcium aluminate. Preferably, the finely ground calcined dolomite is heated to a temperature above the melting point of aluminum, but below the temperature at which the aluminum starts to react upon the charge and into such powder the necessary amount of aluminum scrap is introduced to provide sufficient aluminum to reduce the magnesium oxide in the mixture. Consequently, following this procedure, the magnesium may be evaporated at a later stage either at atmospheric pressure or at a reduced pressure and at a higher temperature, and recovered by condensation. After the magnesium has been evaporated there is a residue consisting mostly of unfused calcium aluminate and with some non-reacted magnesium oxide and surplus aluminum. The residue is finely ground and then reacted with sodium carbonate solution. The sodium carbonate reacts with the calcium contained in the calcium aluminate to form calcium carbonate, and at the same time sodium aluminate is formed and goes into solution. After filtering off the calcium carbonate and the magnesium carbonate formed from unreacted magnesium oxide, a pure liquor of sodium aluminate is produced from which aluminum hydroxide can be recovered in any well known manner, for example, by precipitation with carbon dioxide. After filtering off the precipitated aluminum hydroxide, the sodium carbonate solution is recycled to react a new batch of calcium aluminate.

Another process under the generic aspects of the invention calls for the mixing of aluminum scrap at a temperature between the melting point of aluminum and the temperature at which the aluminum starts to react upon the charge, with powdered quick lime, in such proportions that in a subsequent reaction after the aluminum has been distributed, part of the calcium oxide is reduced to metallic calcium, and the rest of the lime forming with the alumina produced by this reaction, calcium aluminate. Such reactions proceed according to the equation, $$4CaO + 2Al \rightarrow 3Ca + Ca(AlO_2)_2 \qquad (1)$$

It is to be noted that during the distribution of the aluminum through the charge the operator is working at a temperature at which the aluminum will not react with the charge, but in the subsequent reaction at higher temperatures, after the aluminum has been distributed, it reacts with part of the calcium oxide present to evolve vapors of metallic calcium. Also, in pursuing this reaction, it is advantageous to heat the reaction mixture above the boiling point of metallic calcium either at atmospheric pressure or in vacuum. After the calcium has been recovered by distillation, the calcium aluminate is then reacted in the same way as described above in order to recover aluminum hydroxide by the action of sodium carbonate.

The methods provided by the present invention may also be utilized in the field of heavy metal reductions. For instance, chromite concentrates of the composition $FeO.Cr_2O_3$ can be reacted in the same way with aluminum scrap and lime according to the following equation, $$3(FeO.Cr_2O_3) + 8Al + 4CaO \rightarrow \qquad (2)$$
$$3Fe + 6Cr + 4[Ca(AlO_2)_2]$$

For carrying on this reaction, a preferred method involves the mixing of calcium oxide in fine powdered form with the necessary amounts of aluminum scrap at temperatures between the melting point of aluminum and 700° C. The resulting calcium oxide powder coated with aluminum is then mixed with the chromite and brought to the reaction temperature. Ferrochromium alloy is produced which readily separates from the calcium alminate melt. After the recovery of the ferro-chromium, the calcium aluminate is treated in the same way as described in previous examples with sodium carbonate to produce the aluminum hydroxide.

One method provided by the present invention and which is very economical to pursue, contemplates the use, in the reduction of chromites, of calcined dolomite instead of calcined lime, and adding to this material sufficient aluminum scrap to reduce the chromite and also the magnesium oxide contained in the dolomite. This reaction produces metallic magnesium in addition to the other products and proceeds according to the following equation, $$3(FeO.Cr_2O_3) + 12Al + 6(MgO.CaO) \rightarrow \qquad (3)$$
$$6Cr + 3Fe + 6[Ca(AlO_2)_2] + 6Mg$$

In carrying out the reaction, calcined dolomite is treated in fine powdered form with aluminum scrap at temperatures above the melting point of aluminum but below the temperature at which the aluminum starts to react upon the charge and such intimate mixture is ground together with the necessary amount of chromite, and treated at elevated temperatures.

The magnesium is withdrawn either at atmospheric or reduced pressure in vapor form and, after melting in the electric furnace, the residue consists of two layers, a lower one of ferro-chromium alloy and an upper layer consisting of a slag of calcium aluminate. From this calcium aluminate, the aluminum hydroxide is recovered as before.

In all of these cases, it is important that the aluminum scrap be thoroughly distributed among the substances to be reduced. This distribution can be effected very economically in two ways, which are described in my copending application Serial Number 672,531, filed May 27, 1946. This comprises the stirring together of the mineral powder to be reduced, with quantities of aluminum scrap at temperatures above the melting point of aluminum but below the temperature at which the aluminum starts to react upon the charge.

In cases where oxides have to be reduced which are already reacting with aluminum at temperatures around 700° C., then a preferable method is to add aluminum scrap to the calcium oxide or the dolomite powder and then mix the resulting aluminum coated powders with the metallic oxide which is to be reduced.

The figures of drawing illustrate three of the above described processes as representative of the invention. The first deals with the reaction of aluminum scrap with calcium oxide to produce metallic calcium and aluminum hydroxide; the second involves the use of aluminum scrap in reducing dolomite and obtaining metallic magnesium and aluminum hydroxide; and the third illustrates the reduction of chromite and dolomite with aluminum scrap to form metallic magnesium, ferro-chromium alloys, and aluminum hydroxide.

As further illustrative of the invention, the following specific examples are presented.

(1) To one-hundred pounds of finely ground calcined limestone, twenty-four to twenty-six pounds of aluminum scrap are added, and the whole mixture thoroughly stirred at approximately 700° C. until the aluminum is completely dispersed throughout the powdered limestone, whereupon the whole mass is tabletted and the tablets charged into a vacuum retort. At temperatures of from about 1100° C. to about 1250° C., calcium vapors are evolved, and the metallic calcium condenses on the cooler part of the retort in compact form. After removing the calcium, the residue from this reaction, consisting of nearly pure calcium aluminate, is finely ground. One hundred pounds of this residue are treated with four gallons of a 20% sodium carbonate solution, by boiling under reflux for about two hours. After filtering off the calcium carbonate from the sodium aluminate liquor, aluminum hydroxide is precipitated with carbon dioxide, by introducing the gas into a saturator containing the filtrate at about 50° C. The aluminum hydroxide is filtered off, and the sodium carbonate solution returned to treat new batches of residue. The aluminum hydroxide is calcined in a well known manner at temperatures around 1000° C., and from one hundred pounds of residue, there is recovered from twenty-six to twenty-eight pounds of pure alumina.

(2) One hundred pounds of calcined dolomite are intimately mixed with eighteen to twenty pounds of aluminum scrap by charging the finely ground dolomite into a vessel in which it is heated to about 700° C. and the aluminum scrap introduced and the whole mass thoroughly stirred until the aluminum is completely dispersed throughout the powder. After cooling, the mass is tabletted and the tablets charged into a vacuum retort. By heating the retort to temperatures between 850° C. and 1000° C., magnesium vapors are evolved which condense on the cooler part of the retort. After evaporating the magnesium, the residue is withdrawn and finely ground. One hundred pounds of this residue are treated with six gallons of a twenty percent solution of sodium carbonate by boiling the mass under reflux for about two hours. Calcium carbonate, sodium hydroxide, and a solution of sodium aluminate is formed. After filtering off the calcium carbonate in a continuous filter, the filtrate is charged into a saturator into which carbon dioxide is introduced. The liquid is maintained at a temperature of about 50° C. and the aluminum hydroxide is precipitated. If these conditions are maintained, the aluminum hydroxide precipitates in a form easily filtered. The residual liquor now comprises to a great extent the sodium carbonate which has been formed, and this liquor is returned to treat new batches of residue. The aluminum hydroxide is withdrawn from the filter and calcined at about 1000° C. yielding from twenty-seven to thirty pounds of pure alumina.

(3) Eighty parts of calcined dolomite are finely ground, and to the hot ore (at about 700° C.), from twenty-eight to thirty parts of aluminum scrap are added and the mass thoroughly mixed. After cooling, this material is added to one hundred parts of chromite having approximately the following analysis:

| | Per cent |
|---|---|
| FeO | 25 |
| $Cr_2O_3$ | 60 |
| $SiO_2$ | 5 |
| MgO | 8 |
| $Al_2O_3$ | 2 |

After being thoroughly mixed and ground in a ball mill to about 200 mesh, the whole mass is tabletted and the tablets charged into a vacuum retort. At a temperature of from about 850° C. to about 1100° C., pure magnesium vapors are evaporated and these vapors are condensed on the cooler parts of the retort. After removing the magnesium, the residue is charged into an electric furnace of either the resistance or the arc type, or in any type of furnace which affords temperatures up to 1400° C. The residue is fused and separates into two layers, the lower one comprising ferro-chromium and the upper layer comprising a melt of calcium aluminate. This procedure can be carried on continuously and the ferro-chromium and calcium aluminate slag tapped from the furnace at different levels from time to time. One hundred pounds of the slag containing the calcium aluminate are finely ground and mixed with from five to six gallons of a twenty per cent sodium carbonate solution, and the mass boiled under reflux for about two hours as described before. The insoluble residue consists mainly of calcium carbonate but also contains calcium silicate and magnesium carbonate, and is separated from the sodium aluminate liquor by filtration. From the sodium aluminate liquor, aluminum hydroxide is precipitated as described above under the other examples, and pure alumina may be recovered by calcination. One-hundred pounds of the calcium aluminate slag, in this process, yields between twenty-five and twenty-seven pounds of pure alumina.

The scope of the present invention is in no way restricted to the specific examples set forth, but comprises all reactions in which metallic oxides are reduced with aluminum in the presence of calcined lime or calcined dolomite to produce the free metal and calcium aluminate. Obviously, when dolomites are used, metallic magnesium is distilled and recovered as a by-product of the reaction.

In the equations given above, the formation of a calcium aluminate is indicated, which is described by the following formula: $CaO.Al_2O_3$. There are several other calcium aluminates known which are of somewhat different compositions, for example: $3CaO.Al_2O_3$; $5CaO.3Al_2O_3$; and $3CaO.5Al_2O_3$. The calcium aluminate, $CaO.Al_2O_3$, has a melting point of about 1600° C.; the $3CaO.Al_2O_3$ melts at about 1535° C. and the $5CaO.3Al_2O_3$ melts at about 1455° C. All of these aluminates form eutectic mixtures having lower melting points. The lowest is between $3CaO.Al_2O_3$ and $5CaO.3Al_2O_3$ and has a melting point of about 1395° C. This eutectic corresponds to an equal mixture by weight of $Al_2O_3$ and $CaO$. Therefore, it may be advantageous at times to form as an end product other calcium aluminates than the calcium aluminate $CaO.Al_2O_3$, to produce a calcium aluminate slag of the lowest possible melting point. In such cases, enough lime (CaO) is added to the reaction mixture to produce an aluminate corresponding to the composition of the lowest melting eutectic mixture. All of these aluminates react with alkaline sodium compounds to form sodium aluminate and calcium carbonate or calcium hydroxide depending upon the sodium compound used for reaction. Therefore the formation of all the aluminates and their eutectic mixtures as described, lies within the scope of the invention, and it depends upon the particular reaction to be carried out which of the aluminates is more advantageous to produce.

Various changes and modifications may be made in the embodiments illustrated and described herein without departing from the scope of the invention as defined by the following claims.

Having thus described the invention, what is claimed as new and desired to be secured by Letters Patent is:

1. A process for recovering pure aluminum compounds from heterogeneous aluminum scrap of miscellaneous composition and alloying, and at the same time utilizing the high free energy content of the aluminum, which process comprises stirring intimately together a quantity of aluminum scrap of larger than granular size and thicker than foil, at atmospheric pressure, and at a temperature of from about 650° C. to the temperature at which the aluminum reacts upon the charge, with a quantity of finely divided oxide ores including those of light metals, grinding and tabletting the resulting mass, charging the tablets into a vacuum retort, and then heating the material under vacuum to a temperature of from about 850° C. to about 1250° C., whereupon a portion of the light metal content is volatilized, and a residue is obtained consisting of the aluminate of a light metal in a state from which it may be readily converted to a pure compound of aluminum.

2. A process for recovering pure aluminum compounds from heterogeneous aluminum scrap of miscellaneous composition and alloying, and at the same time utilizing the high free energy content of the aluminum, which process comprises stirring intimately together a quantity of aluminum scrap of larger than granular size and thicker than foil, at atmospheric pressure, and at a temperature of from the melting point of aluminum to the point at which the aluminum starts to react upon the charge, with a quantity of finely divided oxide ores including those of light metals, grinding and tabletting the resulting mass, charging the tablets into a vacuum retort, and then heating the material under vacuum to a temperature below the fusion point of the aluminate of the light metal of the oxide used, whereupon a portion of the light metal content is volatilized, and a residue is obtained consisting of the aluminate of a light metal in a state from which it may be readily converted to a pure compound of aluminum by known leaching methods, as by the use of sodium carbonate solution.

3. A process for recovering pure aluminum compounds from heterogeneous aluminum scrap of miscellaneous composition and alloying, and at the same time utilizing the high free energy content of the aluminum, which process comprises stirring intimately together a quantity of aluminum scrap of larger than granular size and thicker than foil, at a temperature of from about 650° C. to the temperature at which the aluminum reacts upon the charge, with a quantity of finely divided calcined lime, whereby the aluminum melts and coats the particles of lime, further heating the mixture under vacuum to a temperature of from about 1100° C. to about 1250° C., volatilizing a portion of the calcium and leaving a residue of nearly pure unfused calcium aluminate, which may be economically converted to pure aluminum hydroxide by known methods.

4. A process for recovering pure aluminum compounds from heterogeneous aluminum scrap of miscellaneous composition and alloying, and at the same time utilizing the high free energy content of the aluminum, which process comprises stirring intimately together a quantity of aluminum scrap of larger than granular size and thicker than foil, at a temperature just above the melting point of aluminum and below the point at which the aluminum reacts upon the charge, with a quantity of finely divided ore containing light metal oxides, including calcium oxide, whereby the aluminum melts and coats the particles of ore, further heating the mixture under vacuum to a temperature above the boiling point of the light metal other than calcium which is used but below the fusing point of calcium aluminate, whereby the said light metal is volatilized and a residue is left which comprises calcium aluminate in a form readily refinable and convertible to pure aluminum hydroxide.

5. A process for recovering pure aluminum compounds from heterogeneous aluminum scrap of miscellaneous composition and alloying, and at the same time utilizing the high free energy content of the aluminum, which process comprises stirring intimately together a quantity of aluminum scrap of larger than granular size and thicker than foil, at a temperature just above the melting point of aluminum and below the point at which the aluminum reacts upon the charge, with a quantity of finely divided dolomite, whereby the aluminum melts and coats the particles of dolomite, further heating the mixture under vacuum to a temperature of from about 850° C. to about 1000° C., whereby magnesium is volatilized and an unfused residue is left which comprises nearly pure calcium aluminate.

6. A process for recovering pure aluminum compounds from heterogeneous aluminum scrap of miscellaneous composition and alloying, and at the same time utilizing the high free energy content of the aluminum, which process comprises stirring intimately together a quantity of aluminum scrap of larger than granular size and thicker than foil with a quantity of finely divided magnesium-oxide-supplying material and calcined calcium-supplying material, at atmospheric pressure and at a temperature above the melting point of aluminum and below the temperature at which the aluminum starts to react upon the charge, so as to coat the particles of the magnesium-oxide-supplying and calcium-supplying ingredients with aluminum, mixing the resulting mass with a quantity of heavy metal oxide, heating the mixture under vacuum to a temperature below the fusing point of calcium aluminate to volatilize the magnesium, then heating the residue to a point where it fuses and separates into two layers, the lower one comprising the free heavy metals and the upper one nearly pure calcium aluminate.

7. The process described in claim 6 in which the heavy metal oxide ingredient comprises chromite concentrates and in which the lower separated layer comprises ferro-chromium.

8. A process for recovering high aluminum compounds from heterogeneous aluminum scrap of miscellaneous composition and alloying, and at the same time utilizing the high free energy content of the aluminum, which process comprises stirring intimately together a quantity of aluminum scrap of larger than granular size, and thicker than foil, at atmospheric pressure, and at a temperature above the melting point but below the reaction temperature with a quantity of finely divided oxide ores including those of light metals, grinding and tableting the resulting mass, charging the tablets into a retort and heating to a temperature sufficient to produce the metal and high alumina compounds.

FRITZ J. HANSGIRG.

REFERENCES CITED

The following references are of record in the file of this patent:

UNITED STATES PATENTS

| Number | Name | Date |
| --- | --- | --- |
| 1,311,380 | Bleecker et al. | July 29, 1919 |
| 1,321,684 | Turner et al. | Nov. 11, 1919 |
| 1,538,893 | Hamilton et al. | May 26, 1925 |
| 1,596,999 | Saklatwalla | Aug. 24, 1926 |
| 1,772,360 | Mitchell | Aug. 5, 1930 |
| 1,885,380 | Simpson | Nov. 1, 1932 |
| 2,179,823 | Kemmer | Nov. 14, 1939 |
| 2,208,586 | Kemmer | July 23, 1940 |
| 2,237,011 | Pokorny | Apr. 1, 1941 |

FOREIGN PATENTS

| Number | Country | Date |
| --- | --- | --- |
| 128,354 | Austria | Jan. 15, 1932 |